J. H. BRADY.
INDICATOR.
APPLICATION FILED FEB. 13, 1919.

1,308,574. Patented July 1, 1919.

Proprietor
James H. Brady
E. W. Anderson Jr.
Attorneys

UNITED STATES PATENT OFFICE.

JAMES HENRY BRADY, OF LOUISVILLE, KENTUCKY, ASSIGNOR TO VISIBLE MEASURE GASOLINE DISPENSER COMPANY OF AMERICA, OF LOUISVILLE, KENTUCKY, A CORPORATION OF NORTH DAKOTA.

INDICATOR.

1,308,574.  Specification of Letters Patent.  Patented July 1, 1919.

Application filed February 13, 1919. Serial No. 276,733.

*To all whom it may concern:*

Be it known that I, JAMES HENRY BRADY, a citizen of the United States, resident of Louisville, in the county of Jefferson and State of Kentucky, have made a certain new and useful Invention in Indicators; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to means for facilitating the reading of a flat-faced graduated indicator rod, working longitudinally within a cylindrical tubular casing, and it consists in the novel construction and combinations of parts, as hereinafter set forth.

Figure 3:
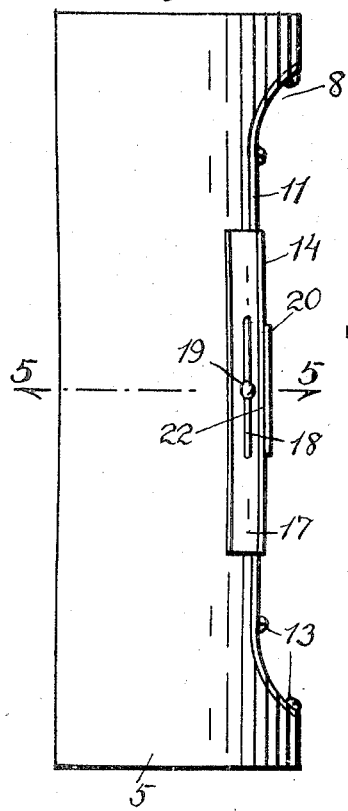
Figure 4:
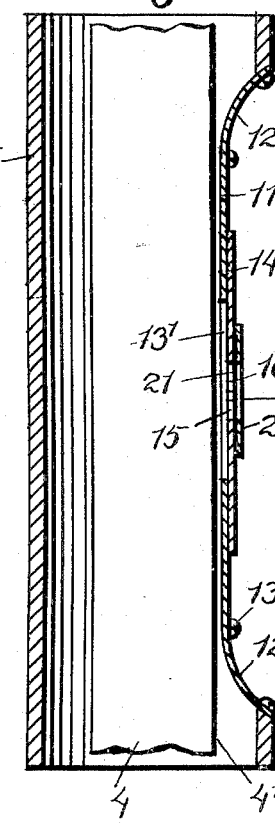
Figure 2:
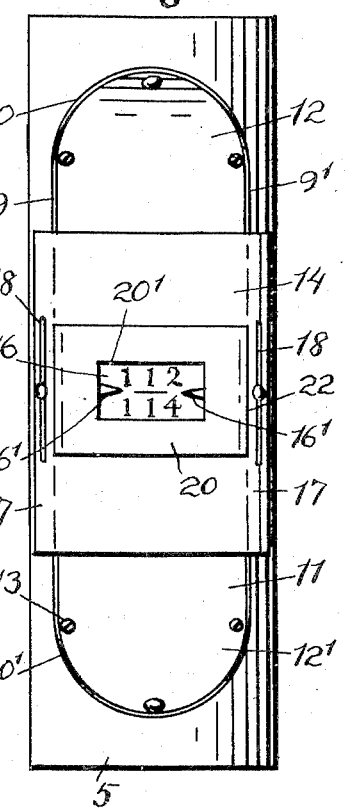
Figure 1:
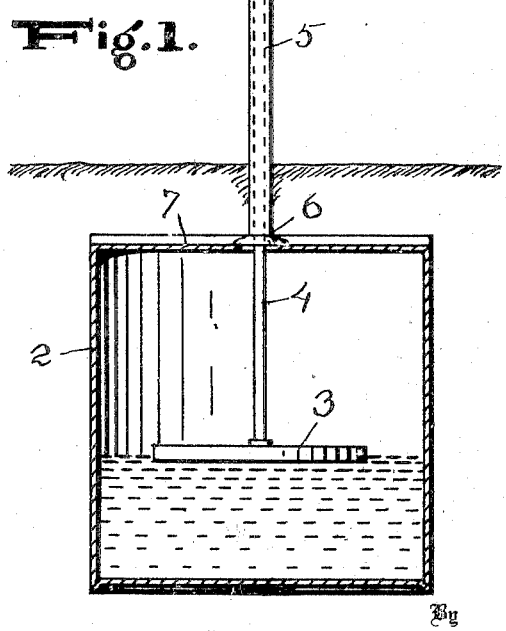
Figure 5:
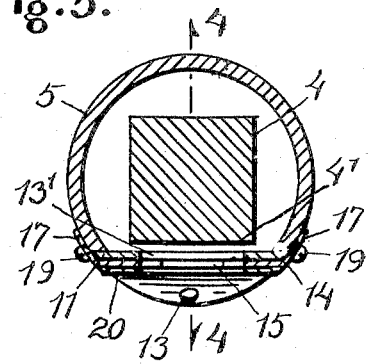

In the accompanying drawings, illustrating the invention, Figure 1 is a front view of the invention as applied, showing the tank in section; Fig. 2 is a detail front view on a larger scale of the invention as applied, with parts broken away; Fig. 3 is a side view of the same; Fig. 4 is a section on the line 4—4, Fig. 5, and Fig. 5 is a section on the line 5—5, Fig. 3.

In these drawings the numeral 2 designates a gasolene storage or ground tank, the fluid within which bears a float 3, having an attached standard or upright rod 4, having a graduated flat face 4′, and which rises and falls with the fluctuations of level of the fluid in the tank.

In order to measure at all times the amount of fluid contained in the tank, the gage rod or standard is graduated as stated, suitably for gallons and fractions thereof, and a cylindrical tubular casing 5, secured at its lower end at 6 to the top 7 of the storage tank, is provided with a suitable pointer or indicator, which is stationary, and in connection with the movable gage rod enables a reading to be taken at any time of the contents of the tank in gallons.

The tubular casing 5 is slotted or cut away longitudinally at the front thereof, at 8, in such manner as to provide edge walls 9, 9′, in the same vertical plane, joined at top and bottom by arcuate or semi-circular end walls 10, 10′, in curved planes, and fitting over the slot of said casing is a planular or flat plate cover 11, located close to the graduated flat face of said rod and provided at top and bottom with semi-circular outwardly extending end portions 12, 12′, in curved planes, marginal screws 13 securing the cover to the edges of the tube.

The plate cover 11 is provided, midway of the length thereof, with an elongated reading opening or slot 13′, and fitting thereover is an outer planular or flat plate cover 14, provided with an opening 15, midway of and smaller than the opening 13′, a transparent insert 16 covering the opening 15. The outer cover 14 is provided, midway of its length, with opposite inwardly extending alined pointers or indicator projections 16′, and in order that these pointers shall, at the start or when the storage tank is empty, accurately register with the zero mark of the graduated gage rod, said cover is made vertically adjustable, preferably by means of angularly turned lateral flanges or extensions 17, having slots 18, screws 19 serving to attach the outer cover or plate to the casing 5, engaging said slots and having the function also of providing for the longitudinal adjustment up or down, as the case may be, by first loosening, and then tightening the screws after the adjustment is effected.

Preferably, the transparent insert 16 is secured in place over the opening of the outer cover 14 by means of a plate 20, having a slot or opening 20′, of the same size as the opening 15, the plate 20 being spaced apart from the cover 14 by a slight interval 21, wherein the transparency or mica or celluloid insert may be slid and frictionally held. The plate 20 is soldered at its lateral portions to the plate 14 at 22.

It is designed by the use of this invention to locate the pointers 16′ close to the graduated flat face of the gage rod, to facilitate an accurate reading being taken of the contents of the storage tank, and at the same time to cover the opening of the tubular casing 5 tightly against the escape to any substantial extent of gasolene fumes.

I claim:

1. In a device of the character described, the combination of a tubular casing having a cylindrical wall, of an indicator rod working longitudinally within said casing and having a flat graduated face opposite said cylindrical wall, the latter having a slot therein, and a vertical flat cover for said slot located close to the flat face of said rod and having a reading opening.

2. In a device of the character described, the combination of a tubular casing having a cylindrical wall, of an indicator rod working longitudinally within said casing and having a flat graduated face opposite said cylindrical wall, the latter having a slot, a vertical flat cover for said slot located close to the flat face of said rod and having a slot of lesser dimensions than those of the first-named slot, and a vertically adjustable flat cover for the smaller slot having a still smaller slot one edge of which is provided with an indicator projection related to the graduations of said rod.

3. In a device of the character described, the combination of a tubular casing having a cylindrical wall, of an indicator rod working longitudinally within said casing and having a flat graduated face opposite said cylindrical wall, the latter having a slot, a vertical flat cover for said slot located close to the flat face of said rod and having a slot of lesser dimensions than those of the first-named slot, and a vertically adjustable flat cover for the smaller slot having a still smaller slot one edge of which is provided with an indicator projection related to the graduations of said rod, and a plate overlying and having a slot of the same size as that of the last-named cover, and a transparent insert between said plate and cover.

In testimony whereof I affix my signature in presence of two witnesses.

JAMES HENRY BRADY.

Witnesses:
  JOHN E. MUELLER,
  THO. M. WETZEL.